United States Patent
Schuettenberg

(10) Patent No.: US 7,789,411 B2
(45) Date of Patent: Sep. 7, 2010

(54) EXTENDED FORWARD TOW SADDLEMOUNT—SINGLE RAIL

(75) Inventor: Donald W. Schuettenberg, Antioch, IL (US)

(73) Assignee: ATC Leasing Company, LLC, Kenosha, WI (US)

( * ) Notice: Subject to any disclaimer, the term of this patent is extended or adjusted under 35 U.S.C. 154(b) by 312 days.

(21) Appl. No.: 11/616,473

(22) Filed: Dec. 27, 2006

(65) Prior Publication Data

US 2008/0157504 A1 Jul. 3, 2008

(51) Int. Cl.
*B62D 53/04* (2006.01)

(52) U.S. Cl. .................. 280/402; 280/400; 280/404

(58) Field of Classification Search ............. 280/402, 280/414; 180/490.1; 414/563
See application file for complete search history.

(56) References Cited

U.S. PATENT DOCUMENTS

| | | | |
|---|---|---|---|
| 3,737,177 A * | 6/1973 | Gal | 280/495 |
| 4,202,562 A * | 5/1980 | Sorenson | 280/415.1 |
| 4,398,743 A | 8/1983 | Belsky et al. | |
| 4,493,491 A | 1/1985 | Karlik | |
| 4,555,214 A | 11/1985 | Morton | |
| 4,737,066 A | 4/1988 | Allison, Jr. | |
| 4,867,468 A | 9/1989 | Paul et al. | |
| 4,949,985 A | 8/1990 | Lichter | |
| 4,974,125 A | 11/1990 | McGehee | |
| 5,326,123 A | 7/1994 | Guest et al. | |
| 5,391,044 A * | 2/1995 | Young | 414/563 |
| 5,401,050 A | 3/1995 | Baker | |
| 5,465,813 A | 11/1995 | Lichter | |
| 5,566,964 A | 10/1996 | Leonard | |
| 5,703,411 A | 12/1997 | Bella et al. | |
| 5,722,677 A | 3/1998 | Lichter et al. | |
| 5,853,283 A * | 12/1998 | Grant | 414/563 |
| 5,873,593 A | 2/1999 | Gesuale | |
| 5,947,503 A | 9/1999 | Tompkins | |
| 6,109,642 A | 8/2000 | Schuettenberg | |

(Continued)

FOREIGN PATENT DOCUMENTS

GB 2040847 A * 9/1980

OTHER PUBLICATIONS

U.S. Appl. No. 10/463,397, filed Mar. 18, 2004, Troha et al.

*Primary Examiner*—Lesley Morris
*Assistant Examiner*—Tashiana Adams
(74) *Attorney, Agent, or Firm*—Vorys, Sater, Seymour & Pease LLP; William H. Oldach, III

(57) ABSTRACT

An extended forward tow, single rail saddlemount or tow bar is disclosed. The tow bar allows a first towing truck to mount a second truck, facing forward, behind the first truck, in order to tow the second truck. The tow bar allows the towed truck to face forward during transport, thus allowing for normal loads and stresses of movement on the towed truck, rather than the much higher high wind loads and unusual stresses imposed by a rear-ward facing tow. The saddlemount is also designed to minimize the required vertical rise on the towed truck, which also avoids additional stresses during loading and unloading onto the towing truck. Lower stress is achieved by using a pivot pin nearer the towed truck rather than the usual pivot pin or king pin on the towing truck.

20 Claims, 9 Drawing Sheets

U.S. PATENT DOCUMENTS

| | | |
|---|---|---|
| 6,120,051 A | 9/2000 | Lichter et al. |
| 6,139,250 A * | 10/2000 | Nolasco ...................... 414/563 |
| 6,209,297 B1 | 4/2001 | Yeomans et al. |
| 6,874,803 B2 | 4/2005 | McDougall et al. |
| 6,893,039 B2 | 5/2005 | Scharmuller |
| 7,017,934 B2 | 3/2006 | Harris |
| 7,100,933 B2 | 9/2006 | Zackovich et al. |
| 7,153,082 B2 * | 12/2006 | Nolasco ...................... 414/563 |
| 7,188,848 B2 | 3/2007 | Chapman |
| 7,422,225 B2 | 9/2008 | Troha et al. |
| 2004/0036255 A1 * | 2/2004 | Orlando ...................... 280/402 |
| 2006/0226612 A1 | 10/2006 | Smith et al. |
| 2008/0036176 A1 * | 2/2008 | Schuettenberg .......... 280/476.1 |

* cited by examiner

EXTENDED FORWARD TOW SADDLEMOUNT—SINGLE RAIL

FIELD OF THE INVENTION

This invention generally relates to towed motor vehicle transportation and tools for assisting in towing of vehicles from one location to another location.

BACKGROUND OF THE INVENTION

The economy of the United States, if not of the world, depends to a great extent on fleets of large trucks for the distribution of goods, such as foods, consumer products, durable goods, and even industrial equipment. There are many manufacturers of such trucks, which concern primarily, but are not limited to, class 7 or class 8 over-the-road trucks. Once these trucks are manufactured, they require shipment or transportation either to the carrier or other company for whom the truck was made, or to a dealer who sells or leases these trucks. The most obvious method to transport these trucks is by driving them directly to their destination. This method has disadvantages, at least because each truck requires a driver, who must be paid for his or her services and for whom return transportation must be arranged.

In order to overcome the necessity of a driver for delivering each truck, a variety of techniques have been devised to use a first truck that will carry or tow one or more additional trucks to the desired destination. One example is shown in U.S. Pat. No. 4,555,214. This patent discloses a tow bar that attaches to the fifth wheel of both the towing vehicle and the towed vehicle. The towed vehicle is towed in a rear-ward fashion behind the front vehicle. Using this technique, the towed vehicle is exposed to the full force of the air that is encountered during the tow. Any aerodynamic surfaces of the towed vehicle will be subjected to reverse stresses, i.e., the wind will impose loads on the truck at 180° from the direction expected during the design of the truck. Thus, the roof cap, side fairings, and any additional fairings, such as side and chassis fairings, should be braced or buttressed for the trip. This adds additional cost to the delivery of the truck. In addition, it is not clear that, even using both fifth wheels, the towed truck will have sufficient freedom of movement to be able to rotate slightly during turns.

Another technique is disclosed in U.S. Pat. No. 4,867,468. This patent discloses a decking bar that mounts to the truck chassis in front of and above the front axle of the towed vehicle. The decking bar has a relatively uniform cross section with differently-shaped end portions and is also relatively short. Using this technique, the towed truck is lifted vertically and is not drawn close in a horizontal direction. In order to minimize the vertical lift, the decking bar is mounted above the front axle of the towed truck, which is then suspended by mounting the decking bar to the chassis of the towed truck.

Another technique is disclosed in U.S. Pat. No. 5,873,593. This patent discloses a piggyback truck transport system. Using this system, a first towing truck mounts a second towed truck on its rear portion. The towed truck is lifted a substantial distance in a vertical direction, putting a stress on the truck and also putting the combination load at risk for violating a vertical height limit. The towed truck is lifted a substantial distance because its front wheels rest on the rear of the towing truck, thus elevating the towed truck a considerable distance. This height may limit the route which is taken in delivering the trucks. The height may be lessened by removing the front tires of the towed vehicles, which also adds to the delivery expense.

Another technique is disclosed in U.S. Pat. No. 6,109,642, for a self-lubricated king pin and saddle assembly. This patent discloses a unique structure and method for lubricating a king pin during towing. The king pin continuously receives lubrication from a series of channels and reservoirs that are periodically refilled. While useful, this apparatus and technique does not solve any specifically aerodynamic problems.

Trucks may also be transported with equipment and a method disclosed in U.S. Pat. No. 6,120,051. This patent discloses a method in which a first truck tows a second, rear-facing truck, using a special beam assembly. In this method, a boom saddle is used in conjunction with the fifth wheel of the towing truck and the fifth wheel or a support mount of the towed vehicle. The special provisions of the boom saddle allow for lateral and vertical movement of the beam assembly. While this method works well, it continues to have the disadvantage of towing a vehicle that faces rearward. Thus, the structure of the towed vehicle must be braced or buttressed during towing, adding to the cost of the tow. In addition, the extra wind resistance of the open rear portion of the truck detracts significantly from fuel economy during a long tow, such as from a manufacturer to a customer or dealer.

The invention provides better equipment and a better method for towing trucks. These and other advantages of the invention, as well as additional inventive features, will be apparent from the description of the invention provided herein.

BRIEF SUMMARY OF THE INVENTION

One embodiment is an extended forward tow saddlemount. The front saddlemount includes a front portion including two devices spaced apart front to rear for separate mounting to a towing vehicle, a middle portion connected to the front portion for adapting an elevation of a towed vehicle, the towed vehicle facing forward, and a rear portion connected to the middle portion for adjustably connecting to the towed vehicle, the rear portion further including a pivot, wherein a position of the front portion is optionally adjustable with respect to the two devices.

Another embodiment provides an extended forward tow saddlemount. The front saddlemount includes a front portion for interfacing with a towing vehicle, the front portion including a first and a second extension plate for mounting to the towing vehicle, a middle portion, configured for connection to the front portion, for adapting an elevation of a towed vehicle, and a rear portion, configured for connection to the middle portion, for mounting to an axle and wheels of the towed vehicle, the rear portion further including an axle mount and two wheel mounts for mounting the towed vehicle, wherein the rear portion further comprises a swivel for rotatable connection to the axle mount and wherein a length of the rear portion is adjustable.

Yet another embodiment is an extended forward tow saddlemount. The saddlemount includes a front portion including two spaced apart mounts configured for mounting to a towing vehicle. The embodiment also includes a middle portion configured for connection to the front portion at a first joint, and a rear portion for removable connection to the middle portion at a second joint, the rear portion further including a swivelable portion configured for mounting a towed vehicle, the swivelable portion further including wheel mounts for the towed vehicle, wherein the rear portion is configured for adjusting a length of the rear portion, and wherein the wheel mounts are optionally configured for adjusting a size of the wheel mounts.

Another embodiment is a method of preparing to tow a forward-facing towed vehicle with a towing vehicle. The method includes a step of furnishing a single rail extended forward tow saddlemount, the saddlemount including a front portion and two spaced apart plates for mounting to the towing vehicle, a middle portion for adapting an elevation of the forward-facing towed vehicle, and a rear portion for adjustably mounting to an axle and wheels of the towed vehicle, wherein the front portion is configured for joining at a first angle to the middle portion and the middle portion is configured for joining to the rear portion at a second angle, and wherein the front portion is configured to allow no horizontal rotation of the saddlemount with respect to the towing vehicle and wherein the rear portion is configured for pivotal mounting to the forward-facing towed vehicle. The method also includes steps of mounting the front portion to the towing vehicle with a mounting pin or a mounting bar, adjusting a length of the rear portion, and mounting the rear portion to an axle or to wheels of the towed vehicle.

Other aspects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
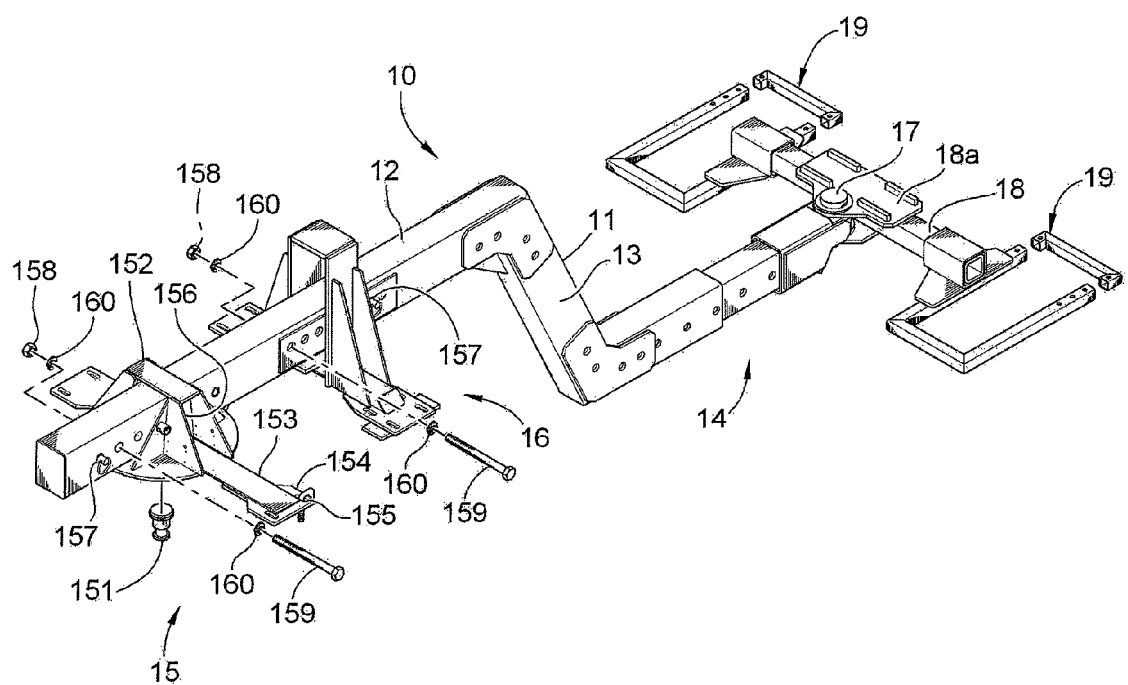
FIG. 1 is a perspective view of a first embodiment of a single rail extended forward tow saddlemount.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

Embodiments of the present invention are highly useful in transporting trucks and other vehicles, including new trucks, from one location to another. While embodiments are most useful in this application, they may also be used to transport other vehicles, such as used trucks, from one dealer to another.

Design for Reduced Stress and Low Profile

As noted above, embodiments of the extended forward tow saddlemount are aimed at safe and economical delivery of vehicles. Accordingly, vehicles towed with the present embodiments and the present method face forward, their normal direction of travel. In this way, there are no additional side loads or wind loads placed on the vehicles. For instance, many highway class 7 and class 8 vehicle have very large aerodynamic cab features, e.g., large fairings designed to deflect the winds encountered in high speed driving. When a truck with these large surface features is towed while facing rear-ward, the beneficial effect of these features is lost. Instead, the aerodynamic features may almost be said to act as a thrust-reverser, since the wind is caught in the rear of the cab. The features and fairings may not be designed for these reversed loads. Thus, in many cases, cabs must be reinforced and buttressed to prevent damage from rear-facing tows at high speed.

In addition, the extended forward tow saddlemount is intended to be as low-profile as possible, in the sense of minimizing the height of the towed vehicle. Minimizing the height assures the safest travel over highways that cross bridges, ramps, and other overpasses. In addition, minimizing the height also minimizes the stress to which the vehicle or truck is subjected when it is hoisted or lifted into position for the tow. The saddlemount is intended to function in as economical a manner as possible. The saddlemount is designed with minimal vertical rise and maximum support of the towed load. One embodiment is preferably configured so that it may be disassembled for easiest transport when it is not being used. This embodiment is preferably equipped with sleeves and locking pins to secure the apparatus in place. Other embodiments may be bolted, welded or otherwise configured in a permanent configuration that is not able to be disassembled.

There are clearly high stresses involved in hoisting a large, bulky truck off the ground and supporting it on another truck. Towing the truck at reasonable speeds adds to the stress, and performing turns and other maneuvers in traffic adds still more stress. Our calculations suggest that lower stress on the tow apparatus may be achieved by better placement of the pivot necessary for turns and other maneuvers. Instead of the traditional pivot on the towing truck, typically achieved by using a pivoting king pin with either a fifth wheel or a saddle assembly with a saddle head, our design places the pivot nearer the towed vehicle. Thus, a two-point attachment is used for the towing vehicle with only a single point, a pivot point, used near the towed vehicle, rather than on the towing vehicle.

Figure 2:
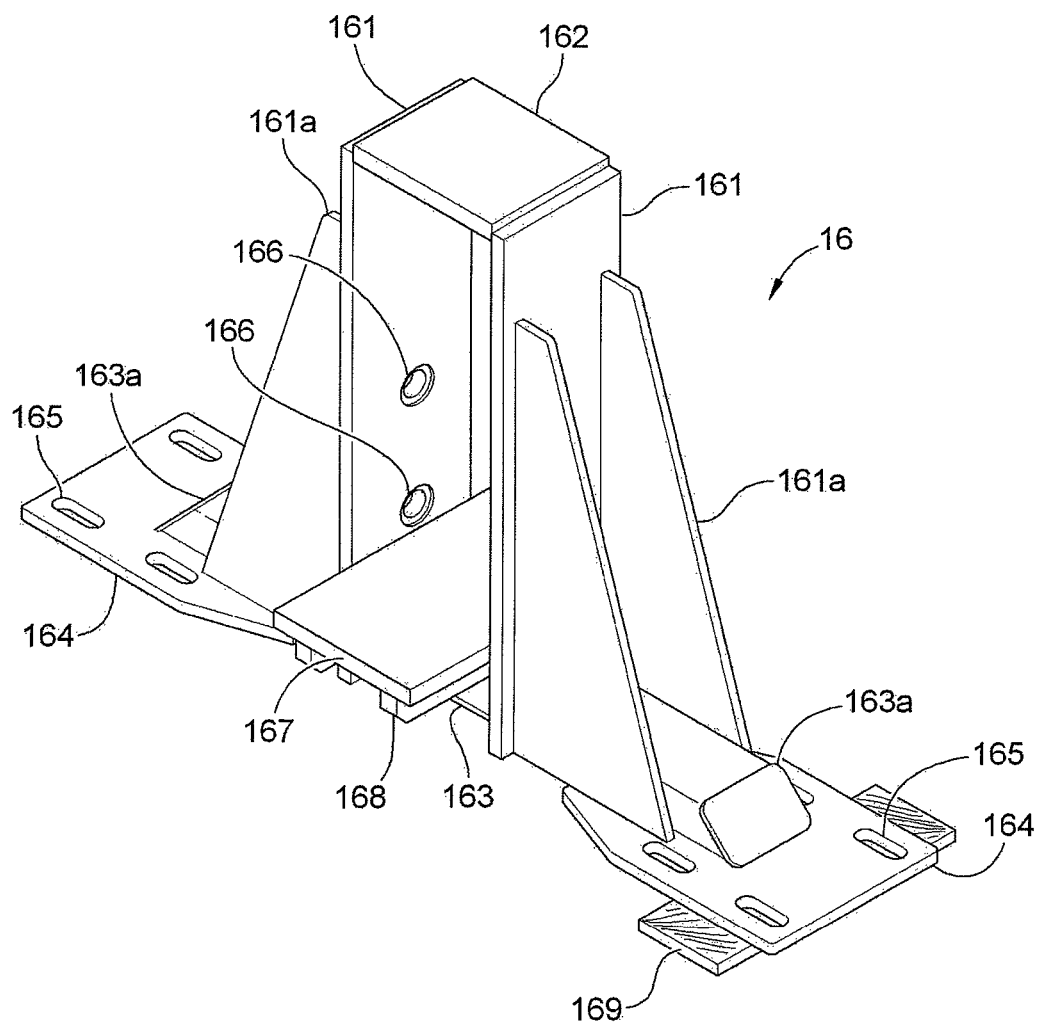
FIG. 2 is a perspective view of an extension plate mount as depicted in FIG. 1.
Figure 3:
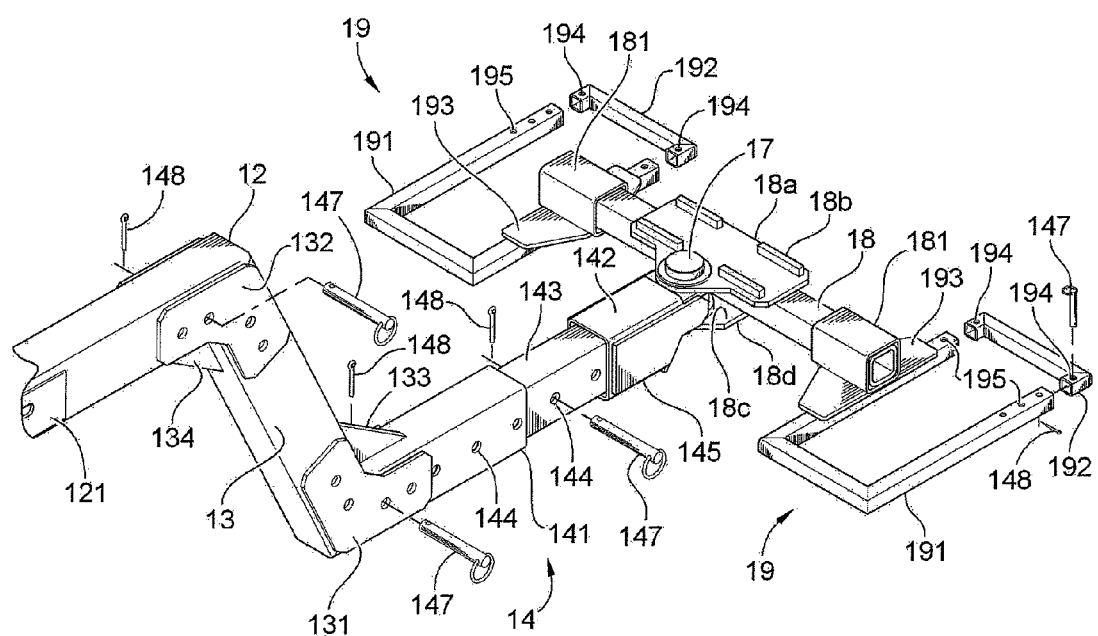
FIG. 3 is an enlarged and more detailed view of the rear portion of the embodiment of FIG. 1.

FIGS. 1-3 depict a first embodiment of a single rail, extended forward tow saddlemount. Single rail saddlemount 10 includes a tow bar 11 with a forward portion 12, an angled, central portion 13, and a rear portion 14. Mounted to the front portion 12 is a fifth wheel mount and extension plate 15 and a second extension plate and an extension plate mount 16. The front portion mounts to a truck or carrier that tows a second truck or vehicle. The rear portion 14 includes a single rear-swivel 17, a rear bracket 18 with a towed vehicle front axle support plate 18a, and wheel mounts 19. While some tow bars have a swivel near the front, i.e., near the towing vehicle, embodiments in this patent have a swivel near the rear of the saddlemount, near the towed vehicle. The front vehicle is prevented from swiveling by using two extension mounting plates that are mounted on the front vehicle. In this embodiment, each of the forward, central, and rear portions include only a single structural element, such as square or rectangular tubing, rather than the twin rails that have previously been used, such as those with two parallel structural elements extending front-to-rear from the towing vehicle to the towed vehicle.

The front portion 12 is preferably made from steel square or rectangular tubing or from welded channels or other structural steel, such as steel plate, for ease of construction. The preferred dimensions are about 6 inches wide and about 8 inches deep, made from ½ inch plate. Other dimensions and other thicknesses are suitable, so long as the weldment or finished piece meets all needed structural requirements. These dimensions will also work well for the central and rear portions 13, 14, of the single rail tow bar.

Front portion 12 includes extension plate 153 with bolting plates 154 on either side of the extension plate. the extension plates preferably have adjustment slots or orifices 155 for ease of installation on the towing vehicle, such as to the truck fifth wheel or frame rails of the towing vehicle using J-bolts or U-bolts. The extension plate 153 mounts to a tow bar mounting bracket 152 as shown. Mounting bar 152 need not be complex, and as shown, may include merely top and side surfaces for securing to extension plate 153, as by welding or bolting. Mounting bar 152 mounts to tow bar front portion 12 by orifices 156, 157. Front portion 12 preferably has a plurality of orifices 157 so that the position of the mounting bar and extension plate may be easily adjusted. The mounting bar is then secured via nuts and bolts, 158, 159, and washers 160, preferably locking washers, or other fasteners. In one embodiment, mounting bar 152 may be similar to a mounting bar disclosed and discussed in FIG. 7. Other mounting devices may be used.

The mounting bracket 16 for the second extension plate is somewhat more complex and has provisions for vertical adjustment in order to accommodate vehicles of different sizes and to allow for a low profile tow. Mounting bracket 16 is preferably a generally pyramidal-shaped weldment made from a number of pieces as herein described. As shown in FIG. 2, mounting bracket 16 includes two parallel side members 161, each with two reinforcing ribs 161a welded to the side members. Side members 161 are secured at the top by welding to a top member 162 and at the bottom to a reinforcing tube 163 and to a bottom member or extension plate 164. The extension plate preferably has bolting adjustment slots or orifices 165 on both its sides. These slots or orifices are preferably used with straight bolts or U-bolts to secure the mounting bracket 16 and its extension plate 64 to the frame or frame rails of the towing vehicle. In one embodiment, extension plates 164 are about ten inches wide, rather than the usual eight inches in previous applications.

Reinforcing tube 163 may also be made as a weldment from steel plate, or may be square or rectangular steel tubing. In one embodiment, the tube is about six inches wide (across) and about two inches high. End plates 163a may be used for additional dimensional stability. Mounting bracket 16 has at least two vertically spaced orifices 166 for placement of a pivot 168. The pivot is preferably steel rod. Note that the pivoting here takes place vertically, allowing for slight vertical movement of the saddlemount or tow bar, not the left-to-right horizontal pivoting associated with turning or other maneuvers of the towed vehicle with respect to the front or towing vehicle. The mounting bracket may optionally include an adjustment plate 167 (not necessarily secured to the mounting bracket or to the steel rod) for precise positioning of the front portion 12 of the tow bar. This plate may includes supports 167a underneath the adjustment or support plate.

The bracket also includes optional adjustment spacers 169 for the vertical adjustment of the bracket. Spacers 169 are typically wood, but other materials may be used.

Front portion 12 of the tow bar may fit through mounting bracket 16 in at least three positions, as shown in FIG. 2. Pivot 168 and adjustment plate 167 may not be used, with the front portion 12 simply resting atop tube 163. In one alternative position, pivot 168 may be secured in the lower orifices 166, spaced about 3 inches above tube 163. The front portion then rests on pivot 168, and further adjustment may be made with adjustment plate 167. In a second alternative, the higher of orifices 166 may be used, the higher orifices in this instance spaced about 3 inches above the lower orifices discussed above. Other heights may be used, and the adjustment plate may also be used for further height adjustment. Instead of a single pin or pivot 168, two may be used in parallel, front to back, for a more stable mounting.

The middle portion 13 and rear portion 14 are shown in greater detail in FIG. 3. Middle portion 13 is preferably made from square or rectangular tubing or steel plate, and is preferably about 6 inches wide (across) and about 8 inches deep. In order to insure the strength of the tow apparatus, reinforcing plates 131, 132 may be used on both sides where the middle portion 13 joins to the forward and rear portions 12, 14. In addition, bosses or flanged bosses 133, 134 may also be used to reinforce the joints. These bosses are preferably joined by welding. However, the bosses may also be secured with fasteners, such as bolts with nuts and locking washers.

Rear portion 14 is somewhat more complex. Rear portion 14 preferably is made from rectangular or square tubing as discussed above, and is also made in three portions. There is a proximal portion 141 joined to mid portion 143 by fasteners, such as threaded bolts or rods 147 and locking cotter pins 148 through orifices 144. Mid portion 143 is preferably welded to distal portion 142. Mid portion 143 is preferably just slightly smaller than mating portions 141, 142, so that mid portion 143 may be easily welded within distal portion 142 and moved within proximal portion 141. If the proximal and distal portions are made from ½ inch plate, the outer dimensions of mid portion 143 will preferably be about a little more than one inch less than those of proximal portion 141 and distal portion 142.

Distal portion 142 may be reinforced with reinforcing plates 145 welded on either side to secure distal portion 142 to top and bottom front axle plates 18a, 18d. At least top front axle plate 18a has an orifice 18c to allow for pivot 17. The front axle plate 18a also includes axle blocks 18b for axle positioning and security. Pivot 17 allows rear bracket 18 to swivel in a horizontal plane with respect to tow bar 11 and in particular with respect to rear portion 14.

Rear bracket 18 is also preferably made from rectangular or square steel tubing, or from steel plates welded together. Rear bracket 18 is thus welded to front axle plates 18a, 18d, and to left and right side reinforcements 181. Rear bracket 18 terminates in tire mounts 19 on either side. The vehicle being towed is mounted with its rear axle on top front axle plate 18a, and with its front tires and wheels in tire mounts 19. Tire mounts 19 may also be fabricated from steel tubing or plate. Tire mount forward portions 191 are preferably welded to reinforcements 181 and to wings 193. This allows a rigid and strong platform for towing a vehicle.

The tire mounts 19 include rear adjustment portions 192 as shown. Rear adjustment portions 192 are preferably slightly smaller than forward portions 191, so that a position of rear portion 192 may be adjusted by inserting rear portion 192 into forward portion 191, and then securing the two using orifices 194, 195 and fasteners. This allows for size adjustment of the tire or wheel mounts, and allows for better securing of the towed vehicle to the towing vehicle. In a preferred embodiment, forward portion 191 may be made from four inch square steel tubing, and rear portion 192 is made with outer dimensions a little more than one inch smaller, both parts made from steel ½ inch thick. Rear portion 192 is preferably insertable as much as about eight to ten inches into forward portion 191, and is secured on each side with two pins or bolts that are locked into place, as with nuts and locking washers or cotter pins.

Figure 6:
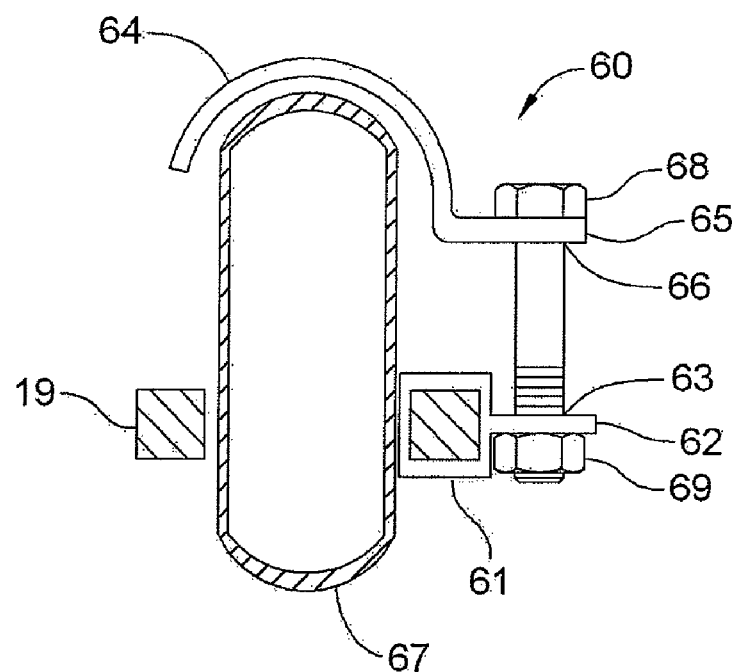
FIG. 6 depicts a wheel security device.

The wheels of the towed truck or vehicle should be positively retained in the wheel mounts. A locking device for accomplishing this is disclosed in FIG. 6. Wheel mount lock 60 includes a lower adapter 61 that fits around the outer portion of the wheel mount 19. Lower adapter 61 includes a mounting flange 62 with an orifice 63. Upper adapter 64 fits around the top portion of the wheel or tire 67 and also includes a flange 65 and an orifice 66. Upper and lower adapter thus secure the wheel or tire in the wheel mount and are themselves secured in place with at least one bolt 68 and a matching nut 69, preferably with lock washers.

Figure 4:
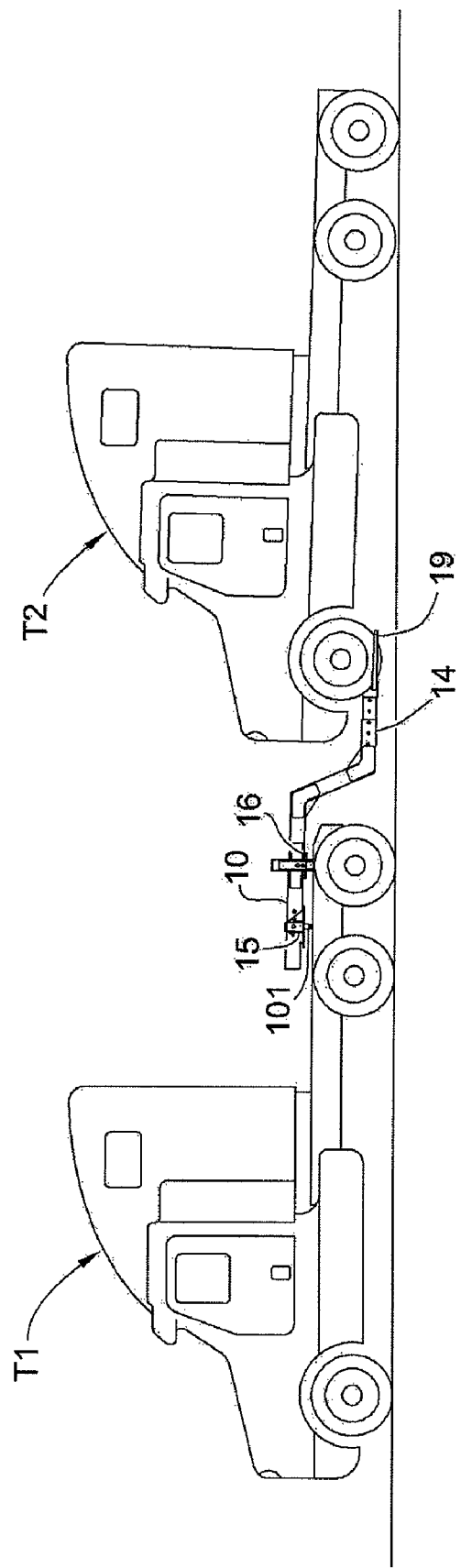
FIG. 4 is a side view of the use of the single rail extended forward tow saddlemount.

As shown in FIG. 4, the single rail extended forward tow saddlemount 10 is secured to a fifth wheel 101 of a towing vehicle T1 with first extension plate 15 and a kingpin. The tow bar is also joined to towing truck T1 via extension plate 16, while towed vehicle T2 rests on the rear portion 14 with its tires and wheels in wheel mounts 19. There are thus two non-swiveling connections to towing vehicle T1 and a single swiveling connection near towed vehicle T2.

Figure 7:
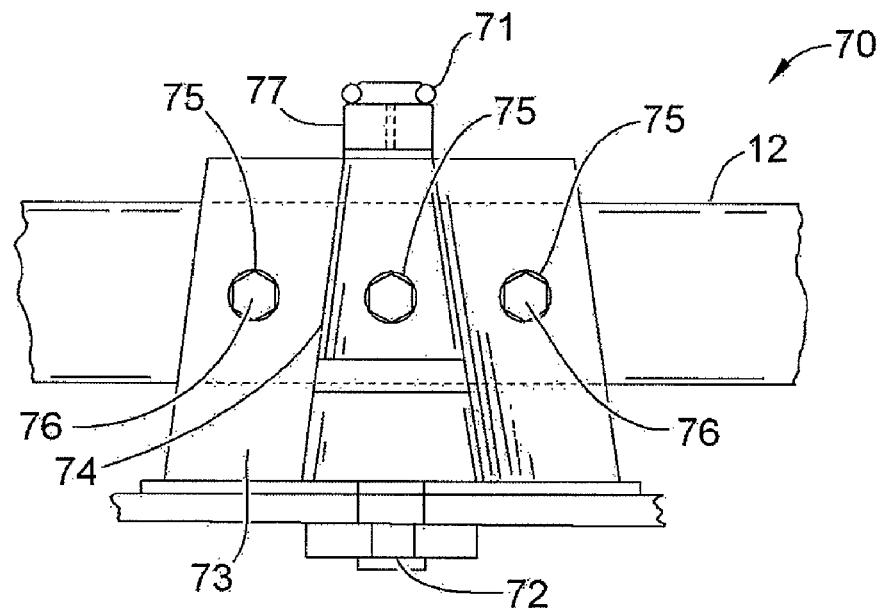
FIG. 7 depicts a prior art mounting bar suitable for mounting via a kingpin to a fifth wheel assembly or via a mounting bar to a saddle assembly.

There are many ways to secure the front portion of the saddlemount to the towing truck or vehicle. One way is to use a support or mounting bar as disclosed in U.S. Pat. No. 5,722,677, which is hereby incorporated by reference in its entirety, as though each page of the patent were set forth herein. The mounting bar 152 of FIG. 2 is very similar to the mounting bar depicted in the referenced patent and reproduced here as FIG. 7. As shown in FIG. 7, support bar 70 secures the front portion 12 of a saddlemount to the towing truck or vehicle. The mounting support includes a mounting bar 71 at a top surface and a king pin 72 at an opposite surface. The mounting surface includes two spaced-apart vertical walls 73 joined by two side plates 74, preferably by welding. The side plates are joined in a support assembly 77 to support the actual mounting bar 71. Mounting bar 71 is configured to be grasped by a saddle head or saddle assembly, as also disclosed in U.S. Pat. No. 5,722,677, and well known to those with ordinary skill in this art.

Figure 8:
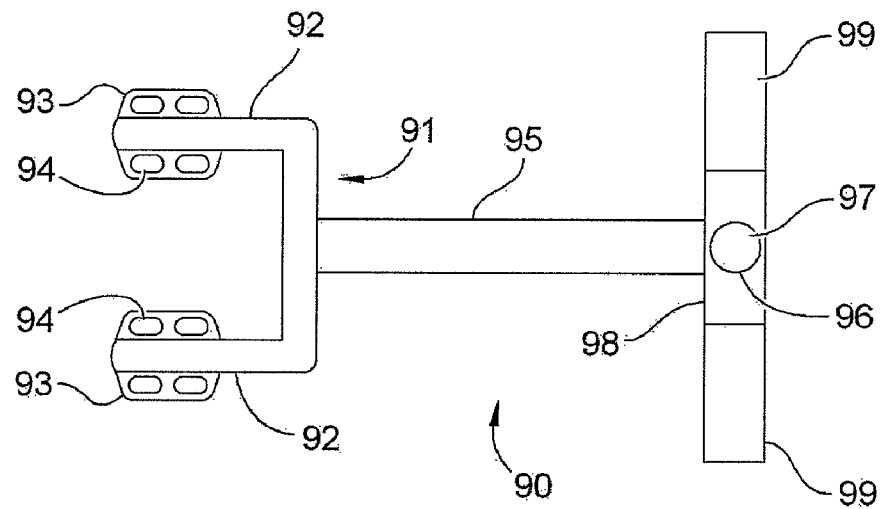
FIG. 8 depicts a combination saddle useful in embodiments described herein.

In other embodiments, the first point of attachment of the single rail extended forward tow saddlemount may be a mounting bar, similar to mounting bar 15 or 71, and connecting to the towing truck or vehicle by a saddle, in which case there is no need for an extension plate. A combination saddle 110 with a king pin 118, saddle head 116, J-claws 117 and J-bolts 120 is depicted in FIG. 8. The saddle base 112 attaches to the towing vehicle with J-bolts or U-bolts (not shown) to the truck fifth wheel, frame or frame rails of the vehicle through slots or orifices 111.

Design for Disassembly

Figure 5:
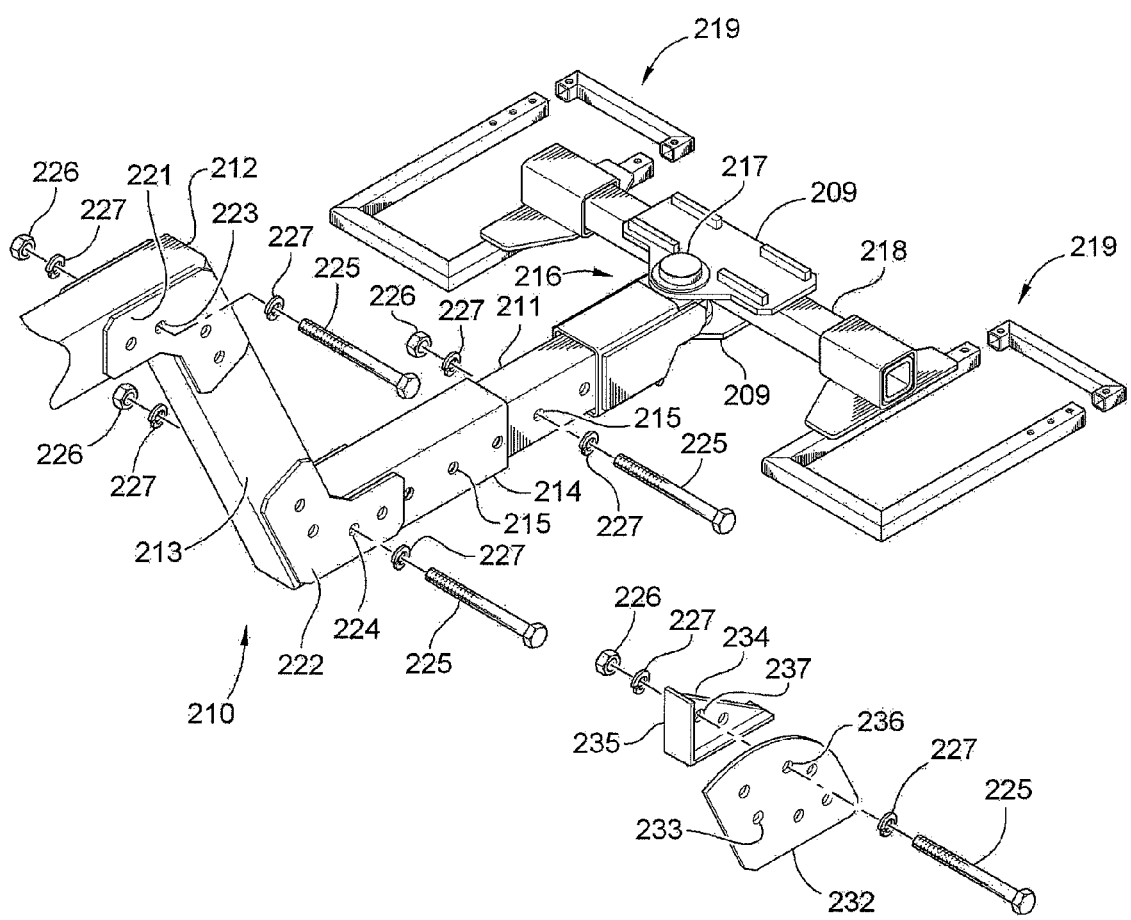
FIG. 5 is an exploded view of an alternate embodiment of the rear portion of the single rail extended forward tow saddlemount.

Another embodiment of a single-rail extended forward tow saddlemount is depicted in FIG. 5. In this embodiment, the tow bar is designed for disassembly, so that it may be returned to the truck assembly plant or other point, such as a truck dealership. The single rail front saddlemount is a bulky, heavy piece of equipment. It must be returned to the truck assembly plant or dealership if it is to be reused. If the apparatus can be disassembled, it may be possible to stow two or three such single-rail saddlemounts in the space occupied by a single apparatus that cannot be disassembled. Note that the embodiments discussed above are already designed for disassembly, since at least the rear portions may be moved for adjusting the length of the tow bar, and thus the rear portions may also be removed, accomplishing disassembly. Further disassembly for shipment is possible.

A single-rail extended forward tow saddlemount designed for disassembly 210 includes a forward portion 212, a mid portion 213, and a rear portion 214 which includes aft portion 216. Forward portion 212 is joined to mid portion 213 with buttress plates 221 on either side of the central square or rectangular tubing that constitutes the forward and mid portions. The buttress plates are preferably at least ½ inch steel and are joined to the forward and mid portions by fasteners, such as bolts 225 with nuts 226 and lock washers 227. At the other end, mid portion 213 is joined to aft portion 214 by an additional set of buttress plates 222 on both sides of the apparatus. The two are joined by fasteners through orifices 224 through the buttress plates and through the mid and aft portions. In some embodiments, the mid and rear portions 213, 214 may be a single portion welded together that cannot be further disassembled.

Rear portion 214 includes an extension 211 that fits within aft portion 216. Aft portion 216 is joined to the rear portion 214 by aligning orifices 215 in the two and joining the portion with fasteners, such as threaded bolts and nuts. Thus, it is relatively easy to disassemble the aft portion by removing the fasteners. The aft portion preferably includes a rear swivel 217 mounted between front axle plates 209, rear bracket 218, and wheel mounts 219.

In some embodiments, the joint between the forward and mid portions 212, 213, or between mid and rear portions 213, 214 may be reinforced with an angled flanged reinforcement by using extended buttress plates that capture the tow bar portions and hold the reinforcement in place. Thus, extended buttress plate 232 is larger than the angled joint of the main portions, larger so that it has, in this example, a first plurality of orifices 233 for attaching to the portions, and a second set of orifices 236 for attaching to angled reinforcement 234 with a flange 235 for better mating to the forward/mid portions or to the mid/aft portions. Angled reinforcement 234 is held in place fasteners through orifices 237, which match the second set of orifices 236.

Figure 9:
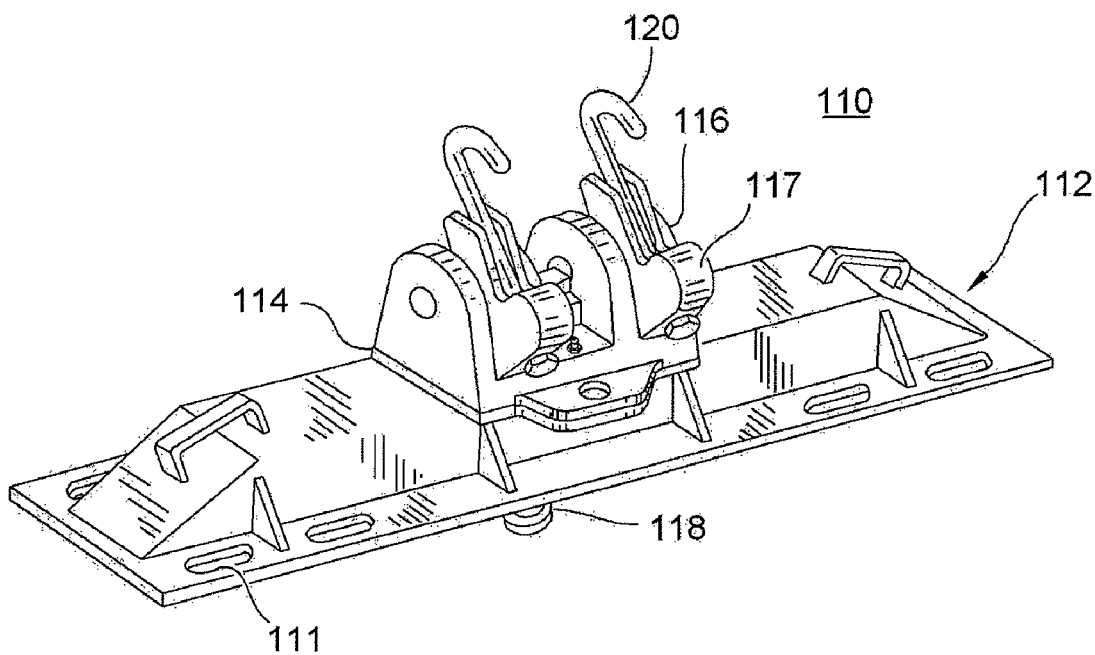
FIG. 9 is a schematic representation of another embodiment.

The embodiments discussed above achieve a rear pivot for the saddlemount and insure that the front or towing vehicle does not pivot horizontally with respect to the front or towing vehicle. This is accomplished by connecting the tow bar to two points on the front vehicle, one point forward and one point rearward with respect to an intended direction of travel of the vehicles. It is also possible to insure that there is no pivoting in the front or towing vehicle by mounting the forward portion of the forward tow apparatus 90 in the manner shown in FIG. 9. In this embodiment, forward portion 91 includes left and right portion 92 and extension plates 93 with slots or orifice 94 for bolting to the frames or frame rails of the towing vehicle. This structure will also hold the towing vehicle firmly and will not allow a front pivot. The pivot takes place at orifice 96 for rear pivot 97, aft of mid portion 95 and joining rear portion 98. Rear portion 98 includes wheel mounts 99.

Figure 10:
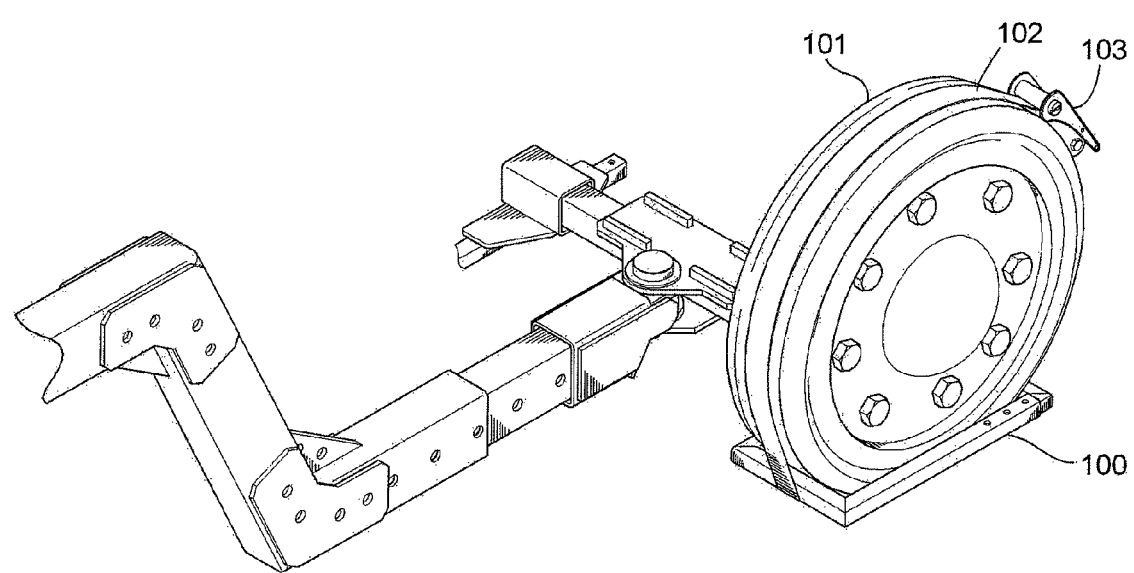
FIGS. 10-11 are additional embodiments for securing wheels or tires to wheel mounts of a single rail tow apparatus.
Figure 11:
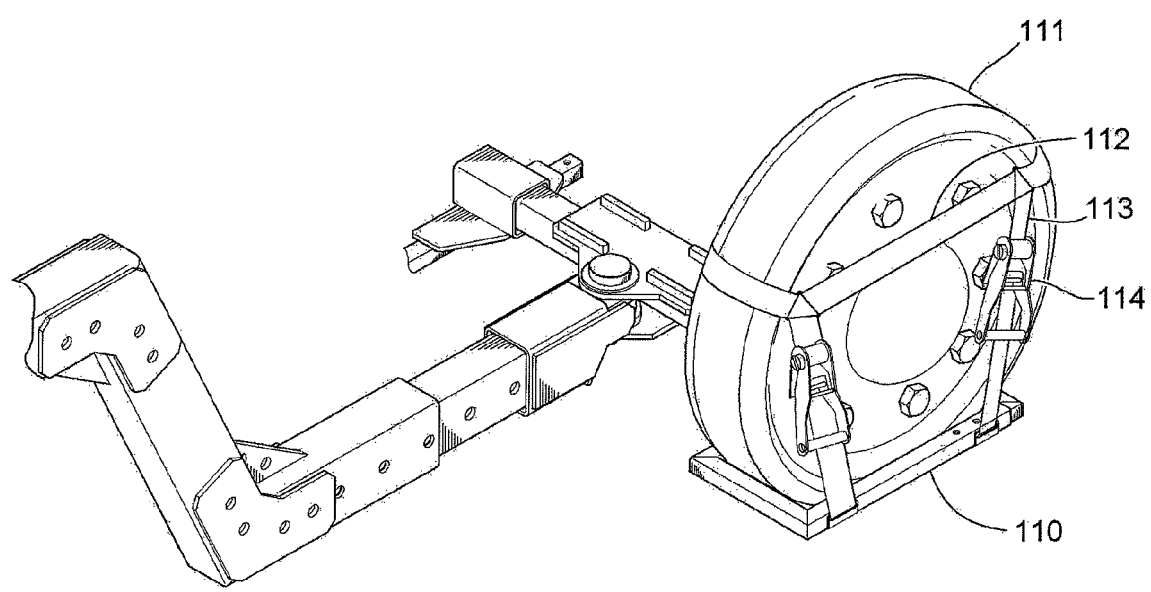

The wheels of the vehicle may be secured within wheel mounts of the front tow apparatus in other ways, such as with sturdy strapping, as depicted in FIGS. 10-11. In FIG. 10, the wheel 101 of a truck is secured to wheel mount 100 by strapping 102 about the circumference of the wheel, and is secured tightly by tightening ratchet 103. The strapping is preferably nylon strapping, but other materials may be used.

In FIG. 11, wheel 111 is secured to wheel mount 110 by a carrier tie-down straps 112, and is secured with two tightening ratchets 114. These methods help to insure the stability of the wheels in the wheel mounts.

Embodiments are not limited to a single towed truck, since more than one truck may be towed, so long as the total length limitation for a combination of towing and towed vehicles, currently 97 feet, is not exceeded. The forward saddlemount 10 allows for adjusting the distance between the towed vehicle and the towing vehicle, allowing a somewhat greater distance between the vehicles than the prior art. In either embodiment, the front axle of the truck being towed, and thus the front wheels, are lifted off the ground only about 8-12 inches, thus minimizing any height increase of the vehicle being towed.

The embodiments described above are only a few of the many possible configurations and uses of the front towing apparatus. The angled construction disclosed is very useful for mounting a towed vehicle to a towing vehicle while minimizing the increase of height of the towed vehicle. The preferred mounting is to lift the front wheels of the towed vehicle off the ground, thus minimizing wear and stress on the towed vehicle while maximizing control by the towing vehicle. If desired, all rear wheels of the towed vehicle can remain on the ground during towing, but lifting the front wheels off the ground is the preferred method.

All references, including publications, applications for patents, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An extended forward tow saddlemount, comprising:
   a front portion situated above a rear bed of a towing vehicle for interfacing with said towing vehicle, the front portion comprising a first and a second extension plate for mounting to the towing vehicle;
   a middle portion, configured for connection to the front portion, for adapting an elevation of a towed vehicle; and
   a rear portion, configured for connection to the middle portion, for mounting to an axle and wheels of the towed vehicle, the rear portion further comprising an axle mount and two wheel mounts for mounting the towed vehicle,
   wherein the rear portion further comprises a swivel for rotatable connection to the axle mount and wherein a length of the rear portion is adjustable.

2. The saddlemount of claim 1, wherein the length of the rear portion is adjustable with orifices and at least one fastener.

3. The saddlemount of claim 1, wherein the second extension plate further comprises an extension plate mount and is configured for vertical adjustment or pivotal mounting of the front portion, or both.

4. The saddlemount of claim 1, wherein the first and second extension plates mount to the towing vehicle with extension plate mounts.

5. The saddlemount of claim 1, further comprising buttress plates joining the front portion to the middle portion in a first joint, or joining the middle portion to the rear portion in a second joint, or both, and optionally comprising at least one reinforcing boss in the first or second joint.

6. The saddlemount of claim 1, wherein the front portion further comprises a support interface, said support interface comprising a kingpin on one side and a mounting bar on an opposite side.

7. An extended forward tow saddlemount, comprising:
   a front portion situated above a rear bed of a towing vehicle comprising two spaced apart mounts configured for mounting to said towing vehicle;
   a middle portion configured for connection to the front portion at a first joint; and
   a rear portion removably connected to the middle portion at a second joint, the rear portion further comprising a swivelable portion configured for mounting a towed vehicle, the swivelable portion further comprising wheel mounts for the towed vehicle,
   wherein the rear portion is configured for adjusting a length of the rear portion, and wherein the wheel mounts are optionally configured for adjusting a size of the wheel mounts.

8. The saddlemount of claim 7, wherein the middle portion is removably connected to the rear portion by orifices and fasteners, or wherein the middle portion is removably connected to the front portion by orifices and fasteners.

9. The saddlemount of claim 7, further comprising buttress plates for connecting at least one of the front and middle portions, and the middle and rear portions.

10. The saddlemount of claim 7, wherein the size of the wheel mounts is adjustable by orifices and fasteners.

11. The saddlemount of claim 7, further comprising a reinforcing boss for the first or second joint.

12. The saddlemount of claim 7, wherein a position of the front portion is adjustable with respect to the two spaced apart mounts.

13. A method of preparing to tow a forward-facing towed vehicle with a towing vehicle, the method comprising steps of:

furnishing a single rail extended forward tow saddlemount, the saddlemount comprising a front portion situated above a rear bed of a towing vehicle, and two spaced apart plates for mounting to said towing vehicle, a middle portion for adapting an elevation of the forward-facing towed vehicle, and a rear portion for adjustably mounting to an axle and wheels of the towed vehicle, wherein the front portion is configured for joining at a first angle to the middle portion and the middle portion is configured for joining to the rear portion at a second angle, and wherein the front portion is configured to allow no horizontal rotation of the saddlemount with respect to the towing vehicle and wherein the rear portion is configured for pivotal mounting to the forward-facing towed vehicle;

mounting the front portion to the towing vehicle with a mounting pin or a mounting bar;

adjusting a length of the rear portion; and mounting the rear portion to an axle or to wheels of the towed vehicle.

14. The method of claim 13, further comprising a step of towing the forward-facing towed vehicle using the single rail extended forward tow saddlemount.

15. The method of claim 13, wherein the front wheels of the towed vehicle are raised about 8-12 inches above a ground surface.

16. The method of claim 13, wherein the step of mounting the rear portion to wheels of the towed vehicle is accomplished with a wheel security assembly.

17. A method of preparing to tow a forward-facing towed vehicle with a towing vehicle, the method comprising:

furnishing an extended forward tow saddlemount according to claim 7;

mounting the front portion to the towing vehicle;

optionally adjusting the length of the rear portion;

mounting the rear portion to an axle or wheels of the towed vehicle; and mounting the rear portion to the towed vehicle using the wheel mounts and optionally, strapping.

18. The method of claim 17, further comprising a step of towing the forward-facing towed vehicle using the front saddlemount.

19. The method of claim 17, further comprising adjusting a position of the front portion with respect to which the two spaced-apart mounts.

20. The method of claim 17, further comprising reinforcing the saddlemount by assembling an angled reinforcement to the first joint or second joint.

* * * * *